(12) United States Patent
Oroskar et al.

(10) Patent No.: US 8,731,589 B1
(45) Date of Patent: May 20, 2014

(54) INTELLIGENT SHORT MESSAGE SERVICE TRANSMISSION

(75) Inventors: Siddharth Oroskar, Overland Park, KS (US); Sachin Vargantwar, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 537 days.

(21) Appl. No.: 12/349,636

(22) Filed: Jan. 7, 2009

(51) Int. Cl.
  *H04W 4/00* (2009.01)
  *H04M 1/725* (2006.01)

(52) U.S. Cl.
  USPC ............... 455/466; 455/412.2; 455/414.4

(58) Field of Classification Search
  USPC ................... 455/466, 412.2, 414.4
  See application file for complete search history.

(56) References Cited

U.S. PATENT DOCUMENTS

| | | | |
|---|---|---|---|
| 7,333,804 B2 * | 2/2008 | Kim ........................... | 455/414.4 |
| 7,609,686 B1 * | 10/2009 | McNamara et al. .......... | 370/356 |
| 7,610,402 B2 * | 10/2009 | Van Datta ..................... | 709/238 |
| 2004/0258215 A1 | 12/2004 | De Vito et al. | |
| 2004/0266411 A1 | 12/2004 | Galicia et al. | |
| 2005/0064883 A1 * | 3/2005 | Heck et al. ..................... | 455/466 |
| 2007/0167148 A1 * | 7/2007 | Ishikawa et al. .............. | 455/405 |
| 2009/0318174 A1 * | 12/2009 | Tarleton et al. ............... | 455/466 |

FOREIGN PATENT DOCUMENTS

EP 1755353 * 2/2007 ............... H04Q 7/28

OTHER PUBLICATIONS

Third Generation Partnership Project (3GPP) Organizational Partners, "3GPP TS 23.140 V6.15.0 (Mar. 2008) 3rd Generation Partnership Project; Technical Specification Group Core Network and Terminals; Multimedia Messaging Service (MMS); Functional description; Stage 2 (Release 6)", Mar. 25, 2008.
Celerity Systems (PTY) Ltd., "Bulk SMS—Internet Based SMS Messaging Solutions", downloaded from the Internet at http://www.bulksms.com/ (last visited Jan. 6, 2009).

* cited by examiner

*Primary Examiner* — Kent Chang
*Assistant Examiner* — Scott Au

(57) ABSTRACT

Disclosed are a method and apparatus for sending a communication to destination client devices. The communication has two message sets: an address set containing an address list and a content set containing content. Both the address set and the content set include one or more messages. The address list includes at least one address for each destination client device. Example content types are text, hyperlinks, web pages, audio, images, and video. Each message of both message sets may be sent separately to a network entity, such as a short message service center. When both message sets are received at the network entity, the network entity may correlate the address set with the content set and responsively send the content to each address in the address list.

16 Claims, 5 Drawing Sheets

INTELLIGENT SHORT MESSAGE SERVICE TRANSMISSION

BACKGROUND

Short messaging service ("SMS") is a very popular method of transferring data to and from wireless devices. SMS provides a mechanism for transmitting short alphanumeric messages to and from wireless devices. Currently, alphanumeric messages up to 160 characters can be supported.

A wireless network may provide a short message service center (SMSC) which acts as a store and forward system for short messages. The store and forward function provides a method of sending short messages to their destination recipient or storing those messages if the recipient is unavailable to receive them. This store and forward function can generally be distinguished from the real-time delivery requirements of voice calls, although SMS messages may be delivered in real time.

The SMSC can send messages to or from a functional entity known as a short message entity (SME). The SME is an entity that can receive or send short messages. The SME is often an application entity that resides on a mobile station. Alternatively, the SME can reside on another entity in a wireless or fixed network. Typically, the SME can be arranged to compose, store, dispose of, act upon, display and/or otherwise manage short messages. The SME may also perform signaling functions to support other delivery features; such as mobile station location and status queries, and mapping of destination addresses.

SUMMARY

A first embodiment of the invention provides a method for sending content to one or more client devices. A communication is received. The message has an address set and a content set. Both the address set and the content set include one or more messages. The address set includes an address list. The address list includes at least one address for each client device of the one or more client devices. The content set of the message includes content. The content is sent to each address in the address list.

A second embodiment of the inventions provides an apparatus. The apparatus includes a network-communication interface, data storage, a processor, and machine-language instructions. The machine-language instructions are stored in the data storage and executable on the processor to perform functions. The functions include: (a) receiving (i) a first input representing an address list comprising a plurality of addresses and (ii) a second input representing content, (b) receiving a first command to send the content to the plurality of addresses, and (c) in response to receiving the first command, sending a first communication via the network-communication interface. The first communication has a first address set and a first content set. Both the first address set and the first content set each have one or more messages. The first address set includes the address list and the first content set includes the content.

A third embodiment of the invention provides a server. The server includes a network-communication interface, data storage, a processor, and machine-language instructions. The machine-language instructions are stored in the data storage and executable on the processor to perform functions. The functions include: (a) receiving a communication from the network-communication interface, the communication including an address set and a content set, both the address set and the content set including one or more messages, where the address set includes an address list, where the address list includes at least one address for each of one or more client devices, and where the content set includes content, and (ii) sending the content to each address in the address list.

BRIEF DESCRIPTION OF THE DRAWINGS

Various examples of embodiments are described herein with reference to the following drawings, wherein like numerals denote like entities, in which.

DETAILED DESCRIPTION

1. Overview

Figure 1:
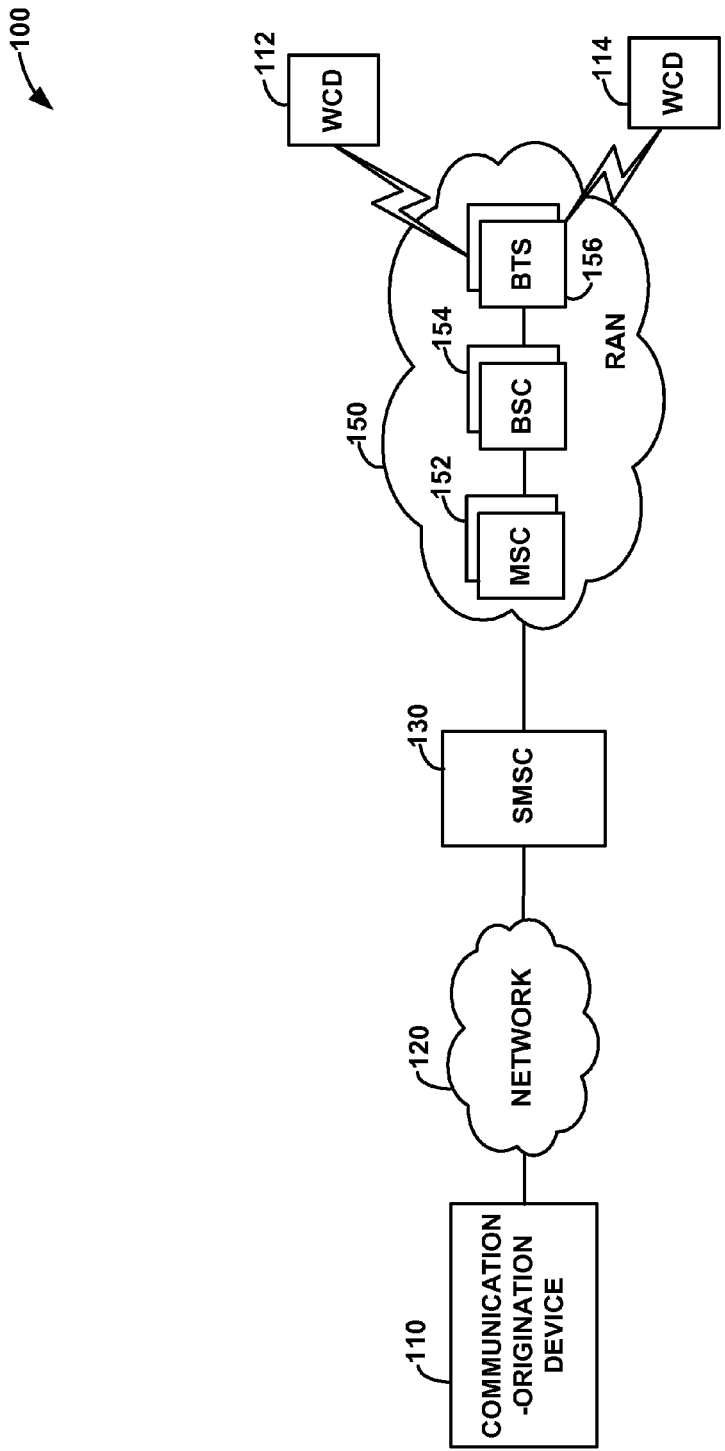
FIG. 1 is a simplified block diagram of a communication system in which the exemplary method can be implemented.

The present invention will be described by way of example in the context of messaging, and in particular, short message service (SMS) messaging, which is well known in the art as a specific mechanism for exchanging text messages with cell phones and other wireless communication devices (WCDs), as defined by industry standards such as IS-41, TIA/EIA-637/IS-637, and Short Message Peer-to-Peer (SMPP) protocol for instance.

The present invention uses a communication sent in at least two message sets—an "address set" and a "content set"—to broadcast content; that is provide content to multiple destination devices. Each message set includes one or more messages, and each message may be sent separately. For example, each of the one or more messages in a message set may be an SMS message. Many other types of messages may be used in a message set as well.

The address set of the communication is a message set that contains an address list for the multiple destination devices. Each address in the address list may use any type of well-known identifier for the corresponding destination device, such as but not limited to telephone numbers, e-mail addresses, mailing list addresses, Internet Protocol addresses, and/or fully qualified domain names (FQDNs).

The content set of the communication is a message set that includes content. The content may include text, audio, images, video, computer software, binary data, and/or other types of content. The address set and the content set of the communication may include information to allow the address set and the content set to be correlated, such as a common message identifier included in all messages of the address set and the content set of for the same communication. Once the address set and the content set are correlated, the content may be sent to each address in the address list.

In operation, a user of a communication-origination device such as a wireless telephone, personal digital assistant, or other device, may be prompted by the communication-origination device to provide the addresses for the address list. Then, the user may be prompted by the communication-origination device to provide the content. The communication-origination device may assign a message identifier for this communication. Then, the communication-origination device send the address set of the communication with the address list and message identifier to a network entity, such as a short message service center (SMSC), base transceiver station (BTS), base station controller (BSC), or similar device. The communication-origination device may send the content set of the communication with the content and the same message identifier to the network entity. The network entity may match the message identifiers in the messages of the address set and the content set to correlate the messages that make up the address set, to correlate the messages that make up the content set, and to correlate the address set to the content set. Once the content set is correlated with the address set, the network entity may send the content to each address on the address list.

The use of an address set and a content set for broadcasting content may reduce data transmission requirements between the communication-origination device and the network entity. For example, suppose a user of a communication-origination device wishes to send a one megabyte (MB) image to each of three friends of the user via the network entity. If the communication-origination device is required to send a separate communication with the content for each of the three friends, the total amount of data transmitted from the communication-origination device to the network entity would be slightly over 3 MB. In contrast, by sending the content only once in the content set of a communication, the total amount of data transmitted from the communication-origination device to the network entity is slightly over 1 MB. In this example, the reduction in the total amount of data transmitted between the two approaches would be approximately 2 MB.

The herein-described method and apparatus are directly applicable to MMS messages as one skilled in the art will readily understand. MMS may be considered as an extension of SMS to include multimedia objects such as, but not limited to, text images, video, audio, web pages, hypertext links, and/or rich text. MMS is described in more detail in Third Generation Partnership Project (3GPP) Organizational Partners, "3GPP TS 23.140 V6.15.0 (2008-03) $3^{rd}$ Generation Partnership Project; Technical Specification Group Core Network and Terminals; Multimedia Messaging Service (MMS); Functional description; Stage 2 (Release 6)", Mar. 25, 2008, which is incorporated herein by reference for all purposes.

However, those of ordinary skill in the art will appreciate that the method is not limited to SMS messaging, MMS messaging, or to communication with wireless communication devices but can be more generally applied with respect to transmission of any types of messages (e.g., packets, e-mail messages, instant messages, SMS messages, MMS messages, etc.) and in the context of message transmission to any types of client devices (e.g., personal computers, appliances, cell phones, personal digital assistants, etc.), to facilitate transmission of the messages to appropriate application logic on the client devices.

2. An Example Communication System

Referring to the drawings, as noted above, FIG. 1 is a simplified block diagram of an example communication system in which the present method can be implemented. In particular, the figure depicts a representative communication-origination device 110 and two representative destination wireless communication devices (WCDs) 112 and 114. Situated between the communication-origination device 110 and the WCDs is a representative communication path including a network 120, a short message service center (SMSC) 130 and a radio access network (RAN) 150. In practice with this arrangement, when the communication-origination device 110 sends a message destined for the WCDs, the message will pass via network 120, through SMSC 130, via RAN 150 and over an air interface to each destination WCD.

To carry out these functions, the communication-origination device 110 and each WCD 112 and 114 preferably takes the form of a computing/communication device, such as a cell phone, personal digital assistant, wirelessly equipped personal computer, personal computer, application server, or other entity now known or later developed configurable to carry out the herein-described functionality of the respective communication-origination device or WCD.

In FIG. 1, the communication-origination device 110 is shown coupled with network 120, which in turn connects with SMSC 130. Network 120 may be the Internet or may comprise some other public or private network that is arranged to carry messages from one point to another. In a rudimentary embodiment, network 120 may be a simple end-to-end connection respectively between the communication-origination device 110 and the SMSC 130. Alternatively, network 120 can be a more complex network, including any number of gateways, routers, proxies, and other intervening elements, including but not limited to the elements of the RAN 150 described below.

Each of the WCDs 112 and 114 may likewise take various forms, examples of which include the computing/communication devices listed above. Preferably, each WCD functions as a short message entity (SME) capable of receiving and processing SMS messages. Each WCD and/or communication-origination device 110 may be further programmed with a plurality of applications, each of which serves a discrete device function that may or may not involve user interaction. Examples of such applications include, without limitation, voice processing, image processing, word processing, phone book, calendar, spreadsheet, games, audio player, video player, web browser, image management, graphics editing, utilities, and other applications now known or later developed.

The SMSC 130 may be a network entity configured to process messages, such as SMS and/or MMS messages. In particular, the SMSC 130 may process messages by receiving one or more requests to deliver content from an originator, such as communication-origination device 110, perhaps store the request, and then deliver the content to one or more destinations, such as WCDs 112 and 114. In accordance with embodiments of the invention, the request may be formatted as a herein-described communication with an address set and a content set.

The RAN 150 may include one or more mobile switching centers (MSCs) 152, one or more base station controllers (BSCs) 154, and one or more base transceiver stations (BTSs) 156. MSC 152 may enable communications between RAN 150 and one or more networks, such as the network 120 and/or the public switched telephone network (PSTN). BSC 154 may control BTS 156 and provide connections between BTS 156 and other network entities, including but not limited to SMSC 130 and MSC 152. BTS 156 may facilitate, establish, and/or control air-interface communication sessions (e.g., voice calls and data sessions) between one or more WCDs, such as WCDs 112 and 114, and one or more networks, such as the RAN 150.

3. An Example Computing Device

Figure 2:
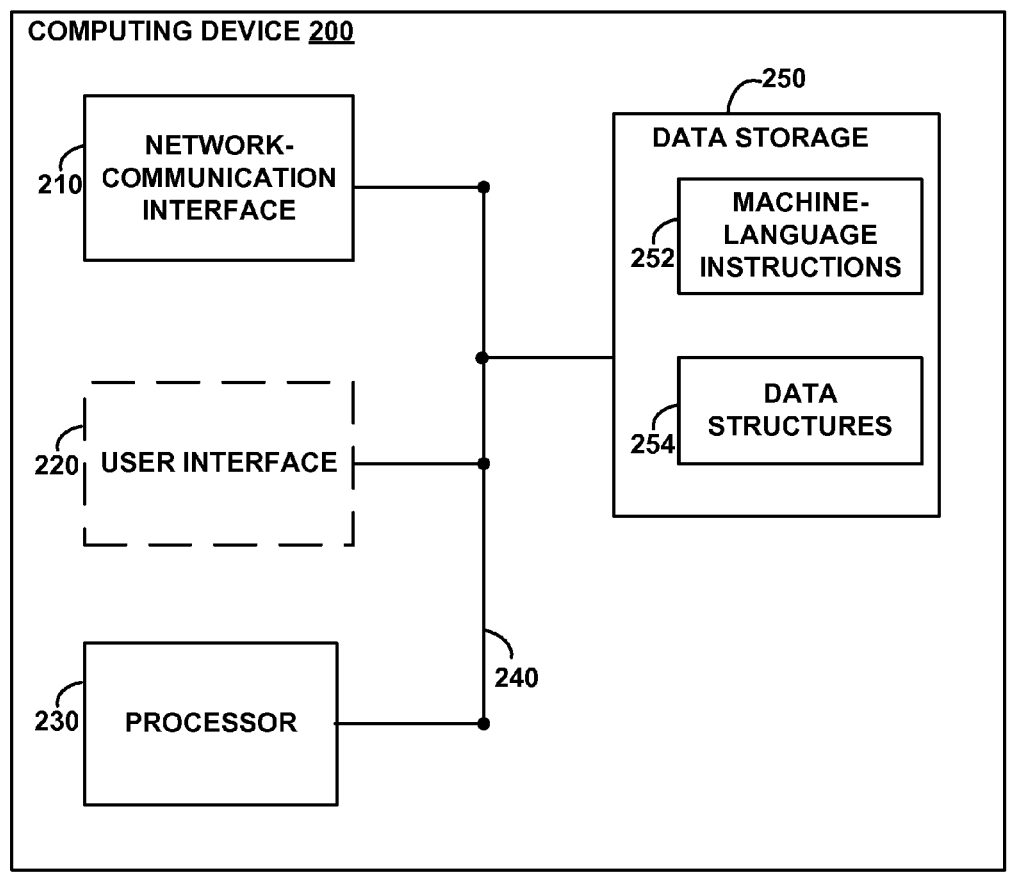
FIG. 2 is a simplified block diagram showing components of an exemplary computing device operable within the exemplary communication system.

Turning briefly to FIG. 2, a simplified block diagram depicting functional components of an example computing device 200 is provided. The computing device 200 may be used as a herein-described SMSC, a network entity, a server, a communication-origination device, and/or as a WCD, among other possibilities. As shown in FIG. 2, the computing device 200 a network-communication interface 210, a user interface 220, a processor 230, and data storage 250, all of which are coupled together by a system bus or other connection mechanism 240.

Network-communication interface 210 may comprise a wireless-communication interface. The wireless-communication interface may include cellular wireless chipset of the type arranged to engage in air interface communication with RAN 150 according to an agreed air interface protocol, such as such as CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and/or others now known or later developed. Further, the network-communication interface 210 preferably includes one or more antennas (not shown) to facilitate air-interface communication. The network-communication interface 210 may comprise, instead or as well, a wired-communication interface. The wired-communication interface, if present, may comprise a wire, cable, fiber-optic link or similar physical connection to a wide area network (WAN), a local area network (LAN), one or more public data networks, such as the Internet, one or more private data networks, or any combination of such networks.

User interface 220 provides a mechanism through which a user can interact with the computing device. The user interface 220 may include input components such as a keypad, keyboard, a microphone, a camera, and/or a touch-sensitive screen, and output components such as a display screen and loudspeaker. The user interface 220 also preferably includes analog-digital conversion circuitry and underlying control logic for interfacing with a user, such as but not limited to prompting and receiving user input for addresses and/or content, converting digital content to a presentable analog form, and receiving analog content and converting it to digital form for transmission or other processing. FIG. 2 shows the user interface 220 with dashed lines to indicate that the user interface 200 is an optional interface to the computing device 200.

Processor 230 may comprise one or more general-purpose processors (e.g., INTEL or AMD processors) and/or one or more specialized processors (e.g., digital signal processors and/or application specific integrated circuits). Data storage 250, in turn, may comprise one or more volatile and/or non-volatile storage components, such as magnetic, optical, electronic, or organic storage, and may be integrated in whole or in part with processor 230.

In the exemplary embodiment, as shown, data storage 250 contains machine-language instructions 252 (i.e., program modules) as noted above, which are preferably executable by processor 230 to carry out particular device functions. Further, the data storage 250 may contain data structures 254 to carry out the herein-described functions, techniques, and procedures, such as, but not limited to, address lists, message identifiers, and/or content storage locations (e.g., buffers).

4 An Example Method for Sending a Communication

Figure 3:
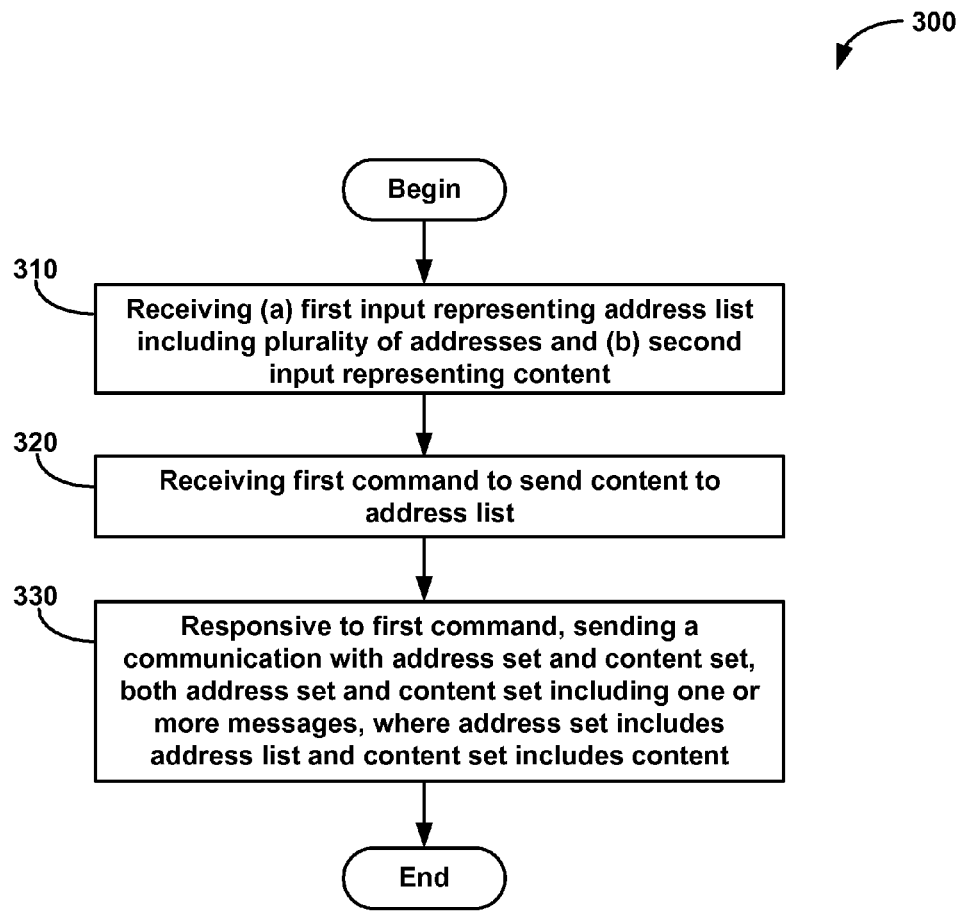
FIG. 3 is a flowchart depicting an example method for sending content to a message list, in accordance with embodiments of the invention.

FIG. 3 depicts a flowchart of a method, in accordance with an exemplary embodiment. In particular, FIG. 3 depicts a method 300 for sending content to one or more client devices. Each block of the method 300 is further explained below.

It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Method 300 may be carried out on communication-origination device 110, WCD 112 or 114, one or more other entities described herein, and/or one or more other entities now known or later developed that are not described herein, without departing from the scope and spirit of the present invention.

Method 300 begins at block 310, where a first input representing an address list comprising a plurality of addresses and a second input representing content are received.

Each address in the address list may be in any format suitable to route the message to a destination client device, such as, but not limited to, telephone numbers (e.g., MSISDN numbers compliant with the E.164 standard), e-mail addresses, Mobile Identification Numbers (MINs), Internet Protocol (IP) addresses (e.g., IPv4 and/or IPv6 addresses), fully qualified domain names (FQDNs), and/or Media Access Control (MAC) addresses.

The address list may include a "list ID". The list ID accesses a pre-defined list of target devices, such as addresses for sports team members, co-workers, fellow hobbyists, and the like. The address list, with or without a list ID, may be stored in the communication-origination device and/or in another network entity. The stored address list for the content may be based on user input, retrieved and selected as the address list.

The content may consist of data of one or more content types including, but not limited to, text, rich text, hyperlinks, web pages, binary data, audio, images, and/or video. Other content types are possible as well. See FIG. 5 below for an example scenario.

At block 320, a first command to send the content to the plurality of addresses on the address list is received. The command may be received from a user, perhaps via a user interface of the communication-origination device. The command may, also or instead, be sent from software; for example, software may examine a schedule or other pre-programmed input and send previously-determined content to a previously-determined address list. One such example is "alarm clock" software that sends a message with textual (e.g., "Wake Up!" or "This is your alarm."), audio content (e.g., a recording of a ringing alarm clock or music such as "Reveille"), and/or video content (e.g., a video clip of a ringing alarm clock or a bugler) at a given time. The schedule, content, and previously-determined address list may be determined based on selections of one or more users. The software may execute on the communication-origination device or some other device. Many other examples are possible as well.

At block 330, responsive to receiving the first command, a communication may be sent via the network-communication interface. The communication may include an address set and a content set. Both the address set and the content set may include one or more messages, such as but not limited to, SMS and/or MMS messages.

The address set and the content set for the communication may include the address list and the content, respectively, described above with respect to block 310. Each message is assumed to have a payload that contains part or all of the address list for the communication (for address set messages) or part or all of the content for the communication (for content set messages).

Each message in the address set and/or the content set may data unique to a given message and/or message set (e.g., a content set or an address set). For example, each message may have a type identifier, a message counter, and/or a type counter. The type identifier may indicate a type for the message set; e.g., "address set" or "content set". The message counter may indicate a message number within a message set. The type counter may indicate the number of messages in the message set. For example, if a message set is a content set made up of 3 separate messages, each message may have a different message counter (e.g., "1", "2", or "3"), with a common type counter for the 3 separate messages of "3" and a common type identifier for the 3 separate messages of "content set". More generally, the type identifier, message counter, and/or type counter may be in a format, such as but not limited to, a numeric format, an alphabetic format, a graphical format, and/or an alphanumeric format. Other formats for the type identifier, the message counter, and/or the type counter are possible as well. Further, many other types of data that is unique to a given message and/or message set are possible as well.

The address set and the content set of the communication may include data common to both parts, such as a message identifier. The message identifier may be in a format, such as but not limited to, a numeric format, an alphabetic format, a graphical format, and/or an alphanumeric format. Other formats for the message identifier are possible as well. Each message in the address set may have a message identifier and preferably, each message in the address set has the same message identifier, such as numeric or alphanumeric identifier. Similarly, each message in the content set may have a message identifier and preferably, each message in the content set has the same message identifier. Further, for a given communication, the message identifier(s) of message(s) in the address set of the given communication are the same as the message identifier(s) of message(s) in the content set. Many other types of data that are common to messages of a communication are possible as well, such as but not limited to, a source address.

The common message identifier may be used by a network entity to determine the destinations for the content. For example, suppose that in a given communication all message identifiers of message(s) in the address set are the same and that all message identifiers in the content set are the same. Then, one technique to match an address set with a content set may include comparing a message identifier of a message in the address set with a message identifier of a message in the content set. If the comparison indicates the address-set-message ID and the content-set-message ID match, the network entity may determine that the corresponding address set and content set are correlated for the given communication. As such, the network entity may determine that the given communication includes the content in the correlated content set destined for the destination addresses of the address list in the correlated address set. The matching and/or correlation may be performed by textual and/or numerical comparison, by querying a more complex data structure such as a hash table or a data base, and/or by some other technique(s).

After sending the communication, the communication-origination device may receive message-delivery notification(s) concerning delivery of content and may display one or more status notifications. Message-delivery notifications and status notifications are discussed in more detail below with respect to block 420 of method 400 and with respect to FIG. 5.

One or more additional communication(s) may be sent from the communication-origination device by repeating the procedures of blocks 310, 320, and 330 as needed.

5. An Example Method for Sending Content to an Address List

Figure 4:
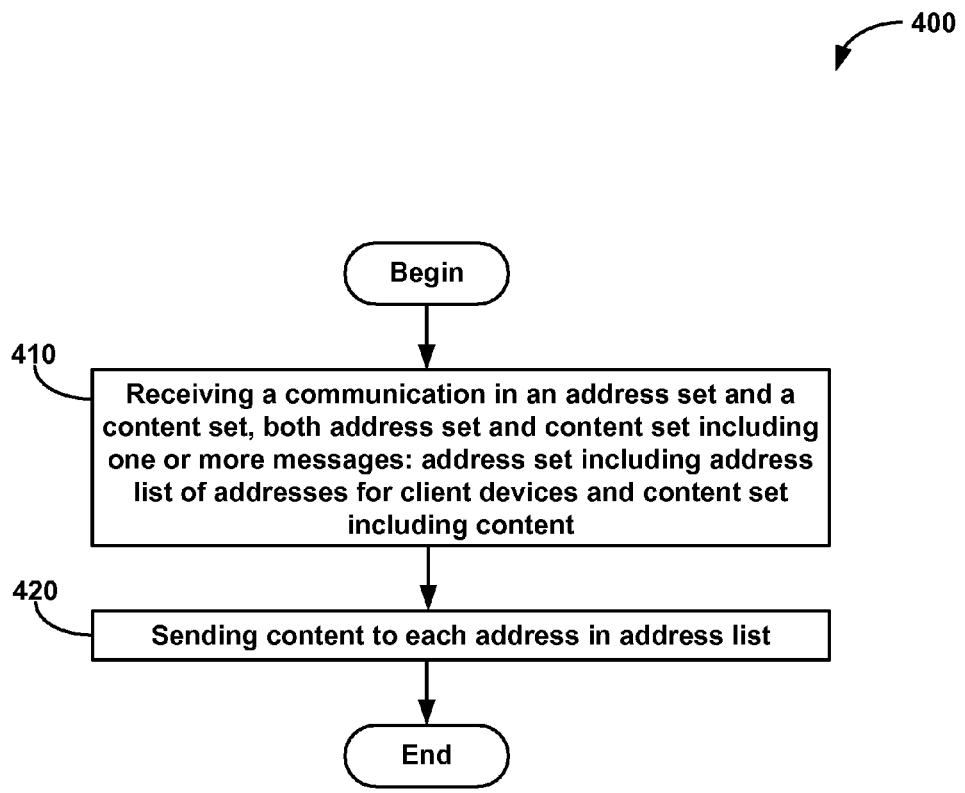
FIG. 4 is a flowchart depicting an example method for sending content to one or more client devices, in accordance with embodiments of the invention.

FIG. 4 depicts a flowchart of a method, in accordance with an exemplary embodiment. In particular, FIG. 4 depicts a method 400 for sending content to addresses in an address list. Each block of the method 400 is further explained below. Method 400 may be carried out by a network entity, such as SMSC 140, a BSC 154, a BTS 156, one or more other entities described herein, and/or one or more other entities now known or later developed that are not described herein, without departing from the scope and spirit of the present invention.

Method 400 may begin at block 410. At block 410, a communication may be received. The communication may be received by a network entity via a network-communication interface described above with respect to FIG. 2. The communication may include an address set and a content set as described above with respect to block 330 of FIG. 3. The address set may include an address list, which in turn includes at least one address for each client device in a plurality of client devices. The addresses in the address list may be in one or more of the formats described above with respect to block 310 of method 300, or perhaps in another format. The content set may include content in one or more of the formats described above with respect to block 310 of method 300, or perhaps in another format.

Each client device may be a computing/communication device, such as a WCD, communication-origination device, cell phone, personal digital assistant, wirelessly equipped personal computer, personal computer, application server, one or more other entities described herein, and/or one or more other entities now known or later developed that are not described herein, without departing from the scope and spirit of the present invention.

Each message in the address set and/or the content set may data unique to a given message and/or message set (e.g., a content set or an address set), such as described above with respect to block 330 of method 300. The address set and the content set of the communication may include common data (e.g., a message identifier), such as described above with respect to block 330 of method 300. The use of common message identifiers for messages in both the address set and the content set of a communication may allow for matching or correlation of the address set with the content set as described above with respect to block 330 of method 300.

At block 420, the content is sent to each address in the address list. The network entity may send the content to each address by generating a message for each address in the address list, inserting the content of into each generated message, and then sending each generated message to an address. The network entity may send the content by placing it in a data area accessible by a client device corresponding to the address (e.g., a mailbox). After placing the content in the mailbox, the network entity may then send a message to the client device that the content is available and/or the client device may periodically or otherwise check the mailbox for new content. Other techniques for sending the content to each address in the address list are possible as well.

After sending the content to one or more the addresses in the address list, the network entity may determine a delivery status for the content. The delivery status may be determined by receipt (or failed receipt) of an acknowledgement of the generated messages described above. If an acknowledgment is not received from one or more addresses in the address list, perhaps after waiting an interval of time, the network entity may attempt retransmission of the generated messages to the one or more addresses. Retransmission may be attempted one or multiple times.

Upon determining the delivery status of the content, the network entity may send one or more message-delivery notifications concerning the communication. Each message-delivery notification may include a notification list of addresses with one or more addresses, and a delivery status of the content for the addresses in the notification list. Example delivery statuses include: (1) successful delivery, (2) unsuccessful delivery, (3) retransmitting content, and (4) unknown. Many other delivery statuses are possible as well. The network entity may include additional information in the message-delivery notification, such as, but not limited to a delivery time, additional explanatory text, and/or message routing information. Upon reception of the message-delivery notification, the message-delivery device may display one or more status notifications to a user, such as described below with respect to FIG. 5.

The procedures of blocks 410 and 420 may be repeated to send additional content to addresses in address lists as needed.

6. Example Scenario for Sending a Communication to an Address List

Figure 5:
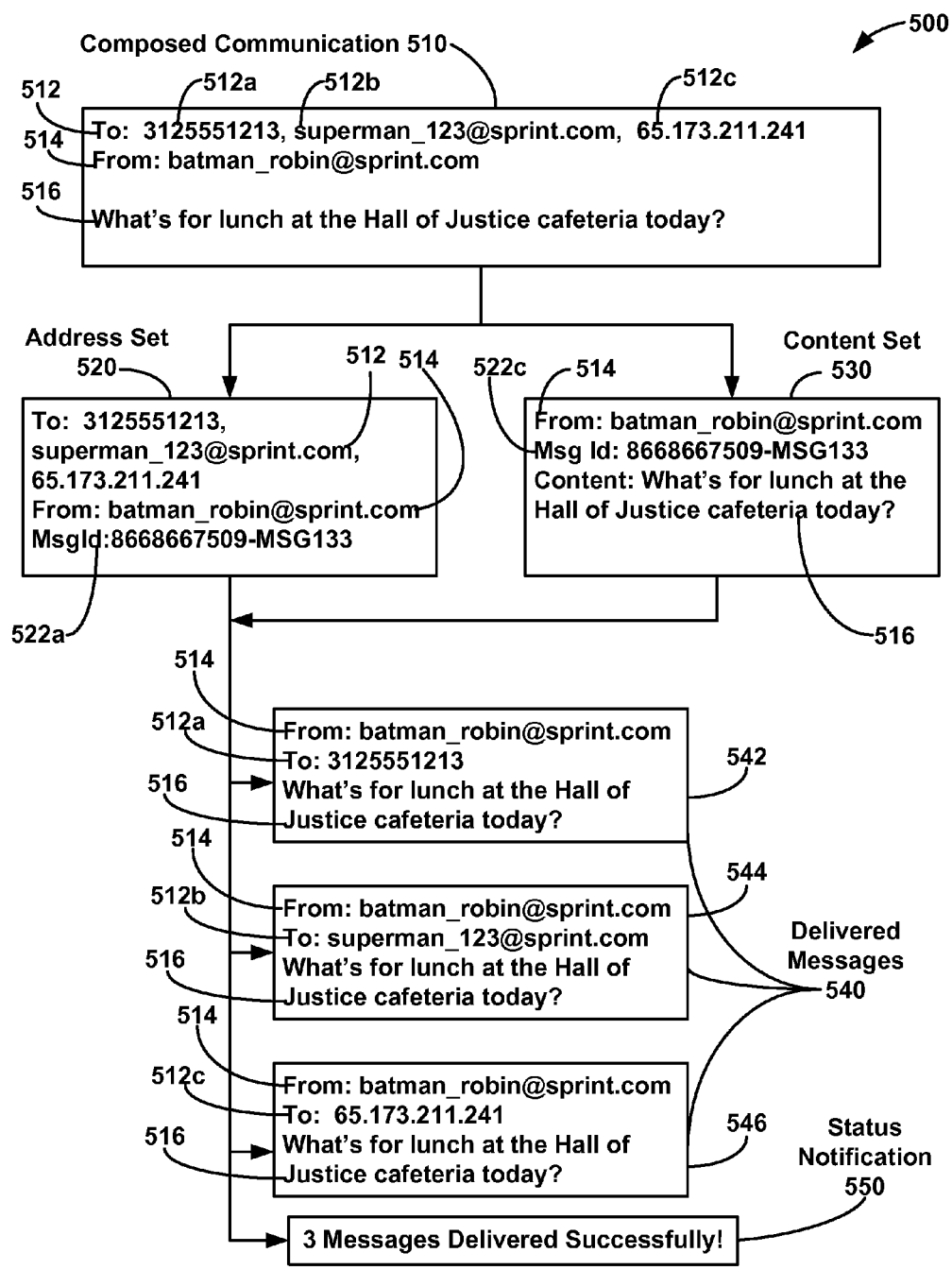
FIG. 5 shows an exemplary scenario for sending content to multiple destinations using a composed communication with an address set and a content set, in accordance with embodiments of the invention.

FIG. 5 shows an exemplary scenario 500 for sending content to multiple destinations using a composed communication 510 with an address set 520 and a content set 530, in accordance with embodiments of the invention. The composed communication 510 is preferably composed using a communication-origination device, such as communication-origination device 110 described above with reference to FIG. 1.

The exemplary composed communication 510 includes an exemplary address list 512, an exemplary message source 514, and exemplary message content 516. FIG. 5 shows the address list 512 including a telephone number 512a of "3125551213", an e-mail address 512b of "superman_123@sprint.com", and an IP address 512c of "65.173.211.241". FIG. 5 shows a message source 514 of "batman_robin@sprint.com" and content 516 of "What's for lunch at the Hall of Justice Cafeteria today?" While FIG. 5 shows text as content 516, the content 516 may also or instead include content of one or more of the content types described above with respect to block 310 of method 300.

The composed communication 510 may be sent as a communication with an address set and a content set from the communication-origination device to a network entity, such as the SMSC 140 described above with reference to FIG. 1. FIG. 5 shows the address set 520 and the content set 530 of the communication. In the example shown in FIG. 5, one message is in the address set 520 and one message is in the content set 530. In alternatives not shown in FIG. 5, the address set and/or the content set may include multiple messages. FIG. 5 shows the message of address set 520 including the address list 512, the message source 514, and a message identifier 522a. FIG. 5 also shows the message of the content set 530 including the message source 514, the content 516, and a message identifier 522c. Note that the message identifier 522a in address set 520 of "8668667509-MSG133" is the same as message identifier 522c of content set 530. The communication-origination device may send address set 520 to the network entity either before or after sending content set 530 to the network entity. In operation, the network entity may match message identifiers in address set and the content set (e.g., message identifiers 522a and 522c) to correlate an address list sent in message(s) of an address set with content sent in message(s) of a content set.

After receiving the communication, the network entity may distribute the content 516 by sending messages to each address in the address list 512. FIG. 5 shows three messages 542, 544, and 546 destined for respective addresses 512a, 512b, and 512c. Each of the three messages 542, 544, and 546 include the message source 514 and content 516. Once the messages 542, 544, and 546 are delivered to the respective addresses 512a, 512b, and 512c, the network entity may send a status indication to the communication-origination device.

Then, based on message-delivery notifications, the communication-origination device may display one or more status notifications. In scenario 500, the three messages 542, 544, and 546 were delivered successfully. The appropriate status notification 550 of "3 Messages Delivered Successfully!" may then be displayed by the communication-origination device.

In an alternative scenario not shown in FIG. 5, a received message-delivery notification may indicate that message 544 was not delivered successfully. The status notification may indicate: (i) that some messages were successfully delivered and that one message was not delivered and perhaps (2) the destination address(es) that did not receive the message (e.g., "2 Messages Delivered Successfully! superman_123@sprint.com did not receive the message.") In case of unsuccessful message delivery, the communication-origination device (or other network entity, such as an SMSC) may automatically resend the content to the corresponding unsuccessful destination(s), prompt the user to resend the content to the unsuccessful destination(s), and/or generate a status notification advising the user (e.g., "To ensure delivery, resend the message to superman_123@sprint.com"). Many other additional actions may be performed and/or status notifications generated based on received message-delivery notifications within the skill of those in the art.

Various exemplary embodiments have been described above. Those of ordinary skill in the art will appreciate, however, that numerous variations, changes, and modifications can be made to those examples while remaining within true scope and spirit of the invention as defined by the claims.

What is claimed is:

1. A method for sending content to a plurality of client devices, the method comprising:

receiving a communication comprising one or more address set messages and one or more content set messages, wherein the one or more address set messages of the received communication cooperatively define an address list, wherein the address list comprises at least one address for each client device in the plurality of client devices, wherein the one or more content set messages of the received communication comprise content, wherein each of the address set messages and each of the content set messages comprises a received message identifier, wherein all of the received message identifiers for the one or more address set messages comprise a same received address-set-message identifier, and wherein all of the received message identifiers for the one or more content set messages comprise a same received content-set-message identifier;

determining whether the same received address-set-message identifier matches the same received content-set-message identifier; and in response to determining that the same received address-set-message identifier matches the same received content-set-message identifier, sending the content of the one or more content set messages to each address in the address list of the one or more address set messages.

2. The method of claim 1, wherein sending the content to each address in the address list comprises sending at least part of the content via a short message service (SMS) message, and wherein at least one of the plurality of client devices is a wireless communication device (WCD).

3. The method of claim 2, carried out by a short message service center (SMSC).

4. The method of claim 1, wherein the content comprises at least one of: text, video, audio, an image, a hyperlink, a web page, and rich text.

5. The method of claim 1, wherein the address list comprises at least one telephone number.

6. An apparatus comprising:
a network-communication interface,
data storage,
a processor, and
machine-language instructions, stored in the data storage and executable on the processor to perform functions comprising:
  receiving (i) a first input representing an address list comprising a plurality of addresses and (ii) a second input representing content,
  receiving a first command to send the content to the plurality of addresses, and
  responsive to receiving the first command, sending a first communication via the network-communication interface, the first communication comprising one or more first address set messages and one or more first content set messages, wherein the one or more first address set messages cooperatively define the address list without comprising the content, wherein the one or more content set messages comprise the content, wherein each of the first address set messages and each of the first content set messages comprises a message identifier, wherein all of the received message identifiers for the one or more first address set messages comprise a same received address-set-message identifier, and wherein all of the received message identifiers for the one or more first content set messages comprise a same received content-set-message identifier.

7. The apparatus of claim 6, wherein the network-communication interface comprises a wireless-communication interface.

8. The apparatus of claim 6, further comprising a user interface and wherein the first input, the second input, and the first command are received via the user interface.

9. The apparatus of claim 8, wherein the functions further comprise:
  storing the address list in the data storage;
  receiving, via the user interface, a third input representing other content;
  receiving, via the user interface, a second command to send the other content to each address in the address list; and
  responsive to receiving the second command, sending a second communication via the network-communication interface, the second communication comprising one or more second address set messages and one or more second content set messages, wherein the one or more second address set messages cooperatively define the address list, and wherein the one or more second content set messages comprise the other content.

10. The apparatus of claim 6, wherein the functions further include:
  after sending the first communication, receiving a status notification for the first communication; and
  displaying the status notification via the user interface.

11. The apparatus of claim 10, wherein the functions further include:
  responsive to determining that the status notification indicates the first communication was not successfully sent, sending a third communication comprising the content to at least one address on the address list via the network-communication interface.

12. A server, comprising:
a network-communication interface;
data storage;
a processor; and
machine-language instructions, stored in the data storage and executable on the processor to perform functions comprising:
  receiving a communication from the network-communication interface, the communication comprising one or more address set messages and one or more content set messages, wherein the one or more content set messages comprise content, wherein the one or more address set messages cooperatively define an address list without comprising the content, wherein the address list comprises at least one address for each client device in a plurality of client devices, wherein each of the one or more address set messages and each of the one or more content set messages comprises a received message identifier, wherein all of the received message identifiers for the one or more address set messages comprise a same received address-set-message identifier, and wherein all of the received message identifiers for the one or more content set messages comprise a same received content-set-message identifier,
  determining whether the same received address-set-message identifier matches the same received content-set-message identifier, and
  in response to determining that the same received address-set-message identifier matches the same received content-set-message identifier, sending the content to each address in the address list.

13. The server of claim 12, wherein sending the content to each address in the address list comprises sending at least part of the content via a short message service (SMS) message, and wherein at least one of the plurality of client devices is a wireless communication device (WCD).

14. The server of claim 12, wherein the content comprise at least one of text, video, audio, a hyperlink, a web page, and rich text.

15. The server of claim 12, wherein the address list comprises at least one telephone number.

16. The server of claim 12, wherein the functions further comprise:
  after sending the content to each address in the address list, determining a received-message status for each address; and
  sending a status notification based on the received-message statuses via the network-communication interface.

* * * * *